UNITED STATES PATENT OFFICE.

ADAM DAUM, OF PORTAGE LA PRAIRIE, MANITOBA, CANADA.

PACKING.

1,133,541. Specification of Letters Patent. Patented Mar. 30, 1915.

No Drawing. Application filed May 20, 1914. Serial No. 839,841.

*To all whom it may concern:*

Be it known that I, ADAM DAUM, a citizen of the Dominion of Canada, residing in the city of Portage la Prairie, in the Province of Manitoba, Canada, have invented certain new and useful Improvements in Packings, of which the following is a specification.

My invention deals with improvements in packings and more particularly to packings used for steam, hot and cold water attachments, and is especially recommended for valve stems as it never hardens and effectively prevents leakage, at the same time leaving the stems nice and free to rotate. It is particularly adapted for use in all manner and shapes as it is made up in bulk and to use, lumps of it are simply broken off and kneaded into the size to fit the box, joint, or place where the packing is required.

My improvement packing comprises the following substances or ingredients mixed in the following proportions: Lead wool nine parts, asbestos fiber three parts, graphite four-fifths parts, cylinder oil one and three-fifths parts, tallow one and three-fifths parts.

The quality of the improved packing depends on the proper proportions and a thorough mixing and in preparing the packing I first proceed to mix the lead-wool and asbestos fiber and it is essential that these be properly worked and mixed in order to insure that it will be thoroughly intermingled with the other ingredients. Next the tallow, oil and graphite are heated together and stirred and then the mixture of lead-wool and asbestos fiber is added and the whole is thoroughly stirred. Afterward the mixture is put under hydraulic pressure and the improved packing is then produced in lumps and to use, it is only necessary to break off the size required and knead with the hands and apply as stated above.

Having thus described the invention what I claim and desire to secure by Letters Patent is:

An improved packing comprising lead wool—nine parts; asbestos fiber—three parts; graphite—four-fifths parts; cylinder oil—one and three-fifths parts; tallow—one and three-fifths parts, substantially as herein set forth and described.

Dated at Portage la Prairie this 14th day of May A. D. 1914.

ADAM DAUM.

Signed in the presence of—
W. R. SEXSMITH,
J. J. ANDRICH.

Copies of this patent may be obtained for five cents each, by addressing the "Commissioner of Patents, Washington, D. C."